United States Patent [19]
Grier

[11] 3,820,571
[45] June 28, 1974

[54] FLUID RESTRICTION ASSEMBLY
[75] Inventor: David G. Grier, Elkins Park, Pa.
[73] Assignee: Fischer & Porter Co., Warminster, Pa.
[22] Filed: Nov. 11, 1971
[21] Appl. No.: 197,843

[52] U.S. Cl. ............................... 138/44, 277/187
[51] Int. Cl. ............................................ F15d 1/02
[58] Field of Search ................ 138/44, 40; 277/187

[56] References Cited
UNITED STATES PATENTS
| | | | |
|---|---|---|---|
| 752,175 | 2/1904 | Monnier | 138/44 |
| 1,714,373 | 5/1929 | Johnson | 138/44 |
| 2,185,940 | 1/1940 | Dudley | 132/40 X |
| 3,101,387 | 8/1963 | Mihran | 277/187 X |

Primary Examiner—Herbert F. Ross

[57] ABSTRACT

A restriction assembly adapted to be installed at the junction of a pneumatic device having an inlet-passage terminating at a wall, and a manifold or other coupling element attachable to the wall and having a fluid-supply passage in registration with the inlet passage, the restriction introducing fluidic resistance between the two passages. The fluid supply passage is enlarged at the junction to create a socket. The restriction is constituted by an elastomeric disc which is press fit into said socket, and a capillary tube pierced through the disc, the tube providing a restricted flow conduit interconnecting the two passages.

4 Claims, 4 Drawing Figures

ELASTOMER SEAL
CAPILLARY RESTRICTION (PIERCED THRU ELASTOMER)

PNEUMATIC DEVICE
AIR SUPPLY
MANIFOLD

FLUID RESTRICTION ASSEMBLY

BACKGROUND OF THE INVENTION

This invention relates to pneumatic or fluidic restrictions.

Pneumatic and fluidic devices such as controllers and relays frequently make use of restrictions to reduce the amount of fluid flow. A restriction is essentially a tube of small diameter which is interposed in a flow passage of larger diameter in order to offer resistance to the passage of fluid therethrough.

Thus in U.S. Pat. No. 3,354,895 there is disclosed a restriction in a pneumatic controller making use of a flapper nozzle element, supply fluid being fed to this element through a fixed restriction. Existing devices for this purpose are in the form of a screw-in assembly having a small capillary tube in its shank which communicates with a lateral outlet hole. A similarly-profiled recess must be cut in the manifold to define a socket for receiving the restriction assembly, the manifold having a duct which couples the outlet of the restriction to the input of the associated pneumatic device.

The above described restriction assembly requires 0-rings and gaskets to maintain a fluidic seal, as well as drilling and threading operations in order to create a socket for receiving the assembly. Thus while the restriction is essentially a flow conduit of reduced diameter, in practice it is a relatively complicated and costly device.

SUMMARY OF THE INVENTION

In view of the foregoing, it is the main object of this invention to provide a restriction assembly of exceptionally simple and low-cost design, which restriction is fully as effective as the more complex assemblies heretofore employed for the same purpose.

More particularly, it is an object of this invention to provide a restriction assembly which is constituted by a capillary tube pierced through a disc of elastomeric material, which assembly when installed, requires no gaskets, 0-rings or other auxiliary means to effect a fluidic seal preventing leakage of fluid.

Briefly stated, in an arrangement in accordance with this invention, a restriction assembly is mounted at the junction between a pneumatic device having an inlet fluid passage and a manifold having a fluid-supply passage in registration with the inlet passage, the fluid-supply passage being enlarged at the junction to define a socket. Seated snugly in the socket is a disc of elastomeric material having a capillary tube pierced therethrough, one end of the tube extending into the inlet passage and the other into the supply passage to reduce the flow therebetween. The disc functions to effect a seal about the capillary tube, as well as to seal the junction between the pneumatic device and the manifold.

OUTLINE OF THE DRAWING

For a better understanding of the invention as well as other objects and further features thereof, reference is made to the following detailed description to be read in conjunction with the accompanying drawing, wherein.

DESCRIPTION OF THE INVENTION

Figure 1:
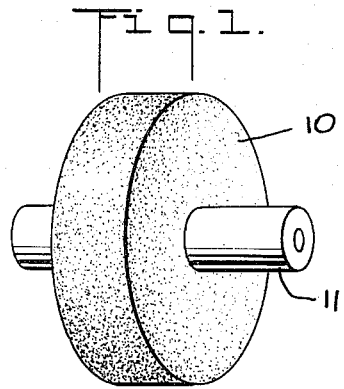
FIG. 1 is a perspective view of a restriction assembly in accordance with the invention.
Figure 2:
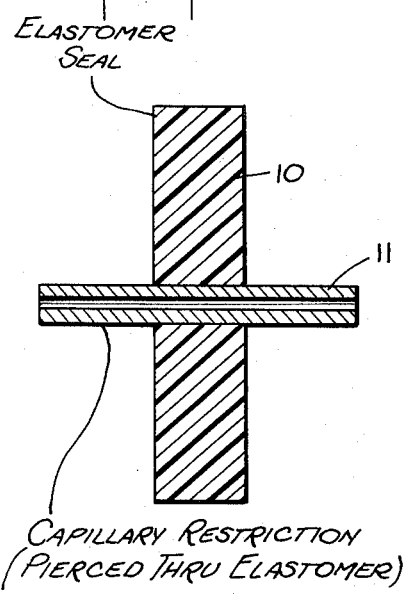
FIG. 2 is a section taken through the assembly.

Referring now to FIGS. 1 and 2, a restriction assembly in accordance with the invention is constituted by a disc 10 of elastomeric material such as neoprene, and a capillary tube 11 formed of stainless steel, Monel metal or any other suitable non-reactive material which can be drawn into a capillary tube.

Elastomeric disc 10 is pierced through its center by capillary tube 11, the surface of the tube being clamped by the elastomeric material of the disc to form a seal so that no fluid can pass through the disc except by way of the capillary tube. The nature of the elastomeric material must be such as to afford a high coefficient of friction between disc 10 and capillary tube 11 to prevent the tube from extruding from the disc. For this purpose, gum rubber, Buna-N as well as neoprene are acceptable.

Figure 3:
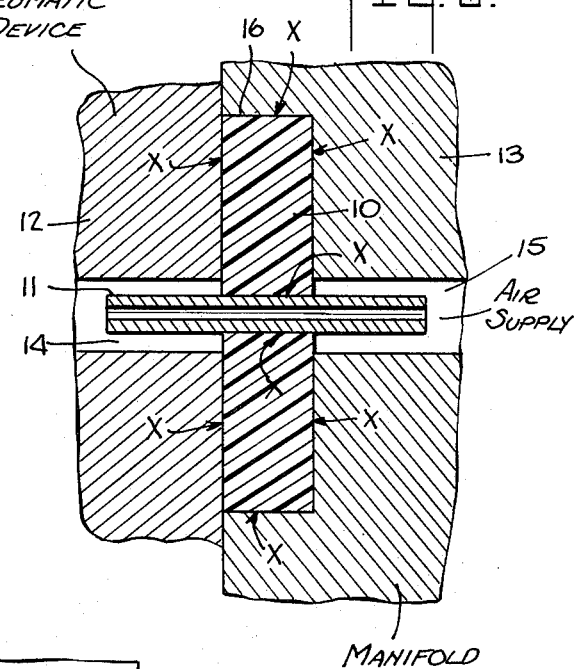
FIG. 3 is a section taken through the adjoining walls of a pneumatic device and a manifold having the restriction assembly installed at the junction thereof.
Figure 4:
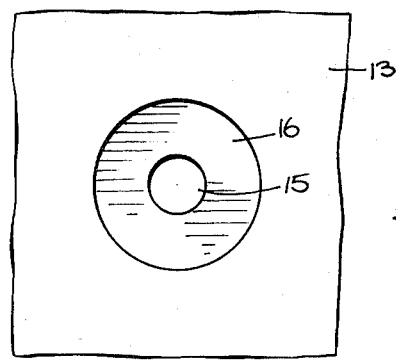
FIG. 4 is an end view of the manifold in which the restriction assembly is seated.

The restriction assembly is installed at the junction or interface of a pneumatic device 12 and a manifold 13, as shown in FIG. 3. The pneumatic device 12 may be any pneumatic or fluidic device or instrument, such as a controller or pneumatic relay requiring a restriction in its inlet passage 14 which terminates at the wall of the device.

Placed against the wall of pneumatic device 12 and tightly held thereto by screws, bolts or other means (not shown), is the wall of manifold 13. The manifold includes an air-supply passage 15 which is positioned in registration with the inlet passage 14 of the pneumatic device and has the same diameter, so that in the absence of the restriction, the fluid flow therebetween is unimpeded.

The restriction assembly is seated in a circular recess or socket 16 preferably formed by enlarging the end of the supply passage 15. The diameter of the socket is slightly less than the outer diameter of disc 10, whereby the elastomeric disc is press-fit and snugly held therein. The depth of the socket is less than the thickness of the disc so that the elastomeric material protrudes slightly from the socket.

The back face of disc 10 engages the base of socket 16 and the circular edge of the disc presses against the circular wall of the socket, thereby effecting a seal between the socket and supply passage 15, so that fluid can only pass through capillary tube 11. The protruding front face of disc 10 is squeezed against the wall of pneumatic device 12 when the wall of the manifold is tightly bolted to the penumatic device, thereby providing a seal between inlet passage 14 and socket 16 and preventing leakage at the interface.

Thus elastomeric disc 10 not only functions to support capillary tube 11 co-axially within passages 14 and 15, one end of the tube extending into passage 14 and the other into passage 15, but it also serves to provide fluidic seals at all possible points of leakage indicated by X's in FIG. 3, thereby confining fluidic flow strictly to the conduit through the capillary tube. It is evident, therefore, that the restriction assembly, though formed of only two components, obviates the need for 0-rings and gaskets entailed by prior-art arrangements.

While there has been shown and described a preferred embodiment of a fluid restriction assembly in accordance with the invention, it will be appreciated that many changes and modifications may be made therein without, however, departing from the essential spirit of the invention.

I claim:

1. A restriction assembly installed at the junction of a pneumatic device and a manifold, said pneumatic device having an inlet passage terminating at a wall, said manifold being attached to said wall and having a fluid supply passage in registration with the inlet passage, the fluid-supply passage being enlarged at the junction to create a circular socket, said assembly comprising:

a. a circular disc of elastomeric material which is dimensioned to be press-fit into the socket and to protrude slightly therefrom to squeeze against the wall of the pneumatic device to effect a fluidic seal at said junction, the diameter of the disc being slightly larger than that of the socket and the thickness of the disc being slightly greater than the depth of the socket, and b. a capillary tube pierced through said disc at the center through, one end of said tube extending into the inlet passage, the other end extending into the supply passage, said elastomeric material being of a substance affording a high coefficient of friction between the disc and the tube to prevent extrusion of the tube from the disc.

2. A restriction assembly as set forth in claim 1, wherein said disc is formed of neoprene.

3. An assembly as set forth in claim 1, wherein said disc is formed of gum rubber.

4. A restriction assembly as set forth in claim 1, wherein said tube is formed of stainless steel.

* * * * *